(12) United States Patent
Suttie

(10) Patent No.: US 7,417,337 B1
(45) Date of Patent: Aug. 26, 2008

(54) METHOD AND SYSTEM FOR FACILITATING NO-BREAK POWER TRANSFER

(75) Inventor: Peter J. Suttie, San Diego, CA (US)

(73) Assignee: Hamilton Sundstrand Corporation, Rockford, IL (US)

(*) Notice: Subject to any disclaimer, the term of this patent is extended or adjusted under 35 U.S.C. 154(b) by 716 days.

(21) Appl. No.: 10/654,768

(22) Filed: Sep. 4, 2003

(51) Int. Cl.
H02J 3/08 (2006.01)
H02J 3/42 (2006.01)

(52) U.S. Cl. .............................. 307/87; 307/68; 307/73
(58) Field of Classification Search ................. 307/87, 307/73, 68, 123, 129, 85, 84; 322/14, 17, 322/44; 290/8, 31, 36 R, 38 R, 40 R, 51, 290/52; 700/295
See application file for complete search history.

(56) References Cited

U.S. PATENT DOCUMENTS

| | | | |
|---|---|---|---|
| 3,665,495 A | 5/1972 | Carter et al. | |
| 3,764,814 A * | 10/1973 | Griffith | 290/40 R |
| 4,106,085 A | 8/1978 | Demarest et al. | |
| 4,370,560 A * | 1/1983 | Faulkner et al. | 290/40 C |
| 4,405,867 A * | 9/1983 | Moakler et al. | 307/64 |
| 4,456,830 A * | 6/1984 | Cronin | 290/27 |
| 4,492,874 A * | 1/1985 | Near | 290/40 B |
| 4,707,142 A | 11/1987 | Baker et al. | |
| 4,728,806 A | 3/1988 | Baker et al. | |
| 4,766,327 A | 8/1988 | Fox | |
| 4,819,423 A * | 4/1989 | Vershure et al. | 60/778 |
| 4,849,923 A | 7/1989 | Samudrala et al. | |
| 4,874,961 A * | 10/1989 | Henderson | 307/87 |
| 4,937,462 A | 6/1990 | Recker et al. | |
| 5,142,163 A | 8/1992 | Hase | |
| 5,276,661 A | 1/1994 | Beg | |
| 5,303,541 A * | 4/1994 | Goff et al. | 60/773 |
| 5,315,533 A | 5/1994 | Stich et al. | |
| 5,317,500 A | 5/1994 | Iden et al. | |
| 5,553,449 A | 9/1996 | Rodgers et al. | |
| 5,555,151 A | 9/1996 | Baker et al. | |
| 5,606,244 A | 2/1997 | Migdal | |
| 5,729,059 A | 3/1998 | Kilroy et al. | |
| 5,784,240 A | 7/1998 | Przywozny | |
| 5,801,937 A | 9/1998 | Gold et al. | |
| 5,844,329 A | 12/1998 | Bailey et al. | |

(Continued)

FOREIGN PATENT DOCUMENTS

EP 0 275 645 A2 7/1988

Primary Examiner—Michael Sherry
Assistant Examiner—Andrew Deschere
(74) Attorney, Agent, or Firm—Carlson, Gaskey & Olds

(57) ABSTRACT

An improved method and system for facilitating no-break power transfer between an APU and a main engine includes determining a required APU speed for conducting power transfer based on various APU operating parameters, such as engine speed, fuel, environmental temperature, etc. The APU controller then adjusts the APU speed up or down to the required APU speed. Communication between an aircraft computer and the APU controller may also be provided so that operational data can be exchanged to adjust the electrical load of the aircraft below a maximum load threshold set by the APU, avoiding overloading of the APU during power transfer. By exchanging operational data between the APU controller and the aircraft computer, both the APU and the electrical load can be adjusted to optimize no-break power transfer despite varying APU operating conditions and main engine generator frequencies.

7 Claims, 3 Drawing Sheets

U.S. PATENT DOCUMENTS

| | | |
|---|---|---|
| 5,864,457 A | 1/1999 | Kates et al. |
| 5,990,575 A | 11/1999 | Flaugher |
| 6,278,262 B1 * | 8/2001 | Ullyott .................. 307/84 |
| 6,291,911 B1 | 9/2001 | Dunk et al. |
| 6,365,982 B1 * | 4/2002 | Iles et al. ................ 290/40 B |
| 6,465,912 B1 | 10/2002 | Nakamura et al. |
| 6,472,774 B1 * | 10/2002 | Bedouet .................. 307/31 |
| 6,476,571 B1 | 11/2002 | Sasaki |
| 6,777,822 B1 * | 8/2004 | Suttie et al. ............... 290/40 A |
| 6,806,589 B1 * | 10/2004 | Suttie ..................... 307/73 |
| 2002/0022542 A1 | 2/2002 | Pfleger et al. |
| 2002/0074863 A1 | 6/2002 | Turvey |
| 2002/0126518 A1 | 9/2002 | Lazarovich |
| 2002/0138158 A1 | 9/2002 | Landreth |
| 2003/0075982 A1 * | 4/2003 | Seefeldt .................. 307/29 |

* cited by examiner

METHOD AND SYSTEM FOR FACILITATING NO-BREAK POWER TRANSFER

TECHNICAL FIELD

The present invention relates to aircraft engine controls, and more particularly to a method and system for transferring power between a main aircraft engine and an auxiliary power unit.

BACKGROUND OF THE INVENTION

Auxiliary power units (APUs) are gas turbine engines used in aircraft systems to provide pneumatic and electrical power to the aircraft, primarily when the aircraft is on the ground. This pneumatic and electrical power is provided by the main propulsion engines when the aircraft is in flight. Power transfers are required between the APU and the main engines at the beginning and at the end of aircraft flights. Additionally, electrical power transfers are also required between the APU and ground power supplies.

Current aircraft designs typically operate electrical power systems at a constant frequency. Electrical power transfers for this type of system can either be a "break transfer," during which neither the APU nor the main engine generator supplies the electrical bus for a short period, or a "no break power transfer," during which the APU generator temporarily operates in parallel with the main engine of ground power to simultaneously supply electrical power to the aircraft electrical bus.

A no-break power transfer (NBPT) technique may be used to achieve load transfer without interrupting the supply of electrical power to the aircraft. During no-break power transfer, the components of the APU speed (i.e., frequency and phase) and the main engine speed are matched so that the APU and the engine can be connected simultaneously to the same electrical bus. No-break power transfer poses its own problems, however. First, the APU may be required to carry a large electrical load during the frequency matching process, potentially causing the APU to overload and cause high-temperature problems in the APU. The maximum electrical load that the APU can handle varies based on the APU operating conditions, such as air temperature and pressure, APU speed, etc. Electrical overload is particularly a problem if the APU is loaded solely by an electrical load with no pneumatic load that can be reduced to compensate for the increased electrical load.

In aircraft designs operating at fixed speeds, no-break power transfer can be conducted by temporarily changing the engine speed to conduct the transfer with the APU and then returning to the predetermined fixed speed. However, modern aircraft designs are increasingly adopting variable frequency electrical bus networks in place of conventional constant frequency systems. The variable frequency bus causes the no-break power transfer process to occur over a range of frequencies rather than a fixed frequency. This makes successful frequency matching between the APU and the main engine more difficult because the APU and the engine no longer return to a single predetermined fixed speed; instead, the speed can vary over a wide range.

There is a desire for a method and system that can ensure frequency matching between an APU and a main engine in a variable frequency system. There is also a desire for a method and system that can conduct no-break power transfer between an APU and a main engine without imposing excessive electrical loads on the APU.

SUMMARY OF THE INVENTION

The present invention is directed to an improved method and system for facilitating no-break power transfer between an APU and a main engine. In one embodiment, the APU controller receives information from the aircraft computer regarding the main engine's speed and calculates a target APU speed for no-break power transfer. The APU controller then adjusts the APU speed up or down to the target APU speed. The rate at which the APU speed is adjusted may be controlled so that it ramps the APU speed to the required APU speed as quickly as possible while optimizing fuel consumption during the ramping.

The APU controller may also determine a maximum electrical load that the APU can sustain using various APU operating parameters. This threshold information is provided to an aircraft computer, and the aircraft computer adjusts an aircraft electrical load until it falls below the threshold, thereby avoiding overloading the APU during the power transfer.

By exchanging operational data between the APU controller and the aircraft computer, both the APU and the electrical load can be adjusted to optimize no-break power transfer despite varying APU operating conditions and main engine generator frequencies.

DETAILED DESCRIPTION OF THE EMBODIMENTS

Figure 1:
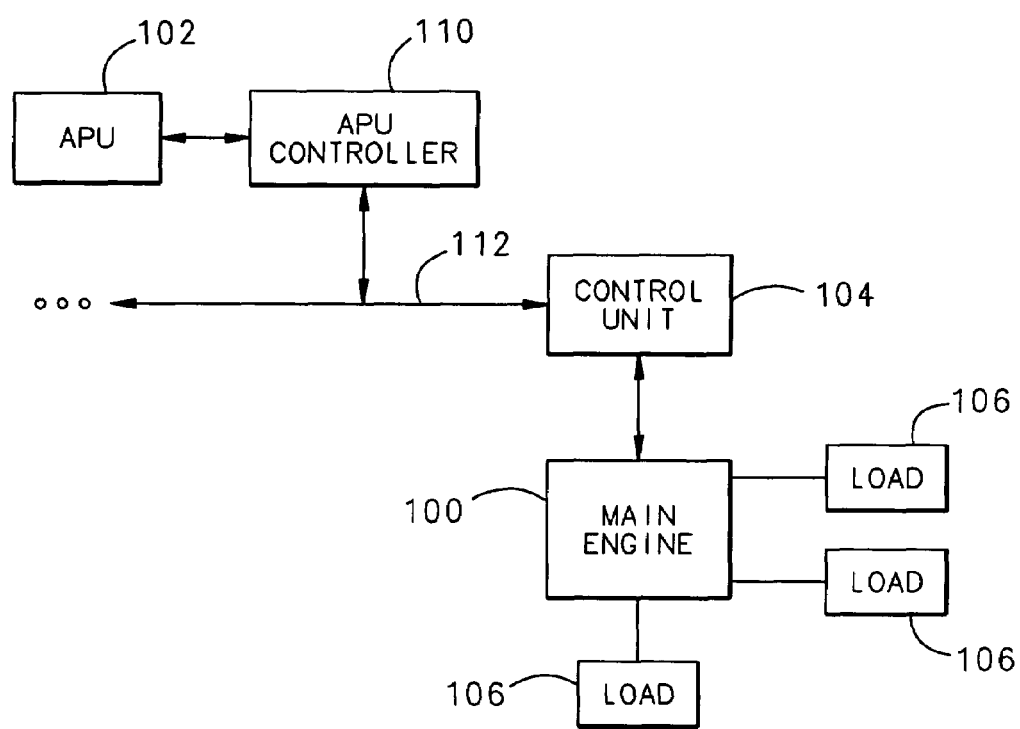
FIG. 1 is a block diagram illustrating an operating environment for the invention.

FIG. 1 is a block diagram illustrating an operating environment of the present invention. The invention is generally directed to a system that allows no-break power transfer between a main engine 100 and an APU 102. The main engine 100 can be an aircraft engine generator, ground power connected to an airport terminal, or any other similar device. Although the example below focuses on an aircraft engine acting as the main engine 100, those of ordinary skill in the art will understand that the invention is applicable to any system where no-break power transfer between a main engine 100 and an APU 102 is desired.

The main engine 100 is controlled by a control unit 104, such as a generator control unit or aircraft computer, and provides power to electrical devices, or loads 106. The loads 106 can be any device that draws power from the engine 100. In the case of an aircraft, for example, the loads 106 may be aircraft devices such as galleys, passenger compartment devices, cockpit lights, etc. The APU 102 has its own associated APU controller 110 that communicates with the control unit 104 via a communication bus 112. APU control can be conducted by any known method, such as digital, analog, or hydromechanical systems, without departing from the scope of the invention.

The control unit 104 sends data to the APU controller 110 on various parameters (e.g., ambient temperature, current engine speed, fuel rate, etc.) that can influence the appropriate speed and load at which the engine 100 and the APU 102 should operate for optimum performance and for smooth no-break power transfer.

Generally, the invention aims to control the speed of the APU 102 to an appropriate speed that will ensure successful no-break power transfer. If the main engine 100 is a variable speed engine, the APU speed that will be considered appropriate for no-break power transfer will not be a fixed number because the optimum engine speed, and therefore the appropriate APU speed, will vary depending on the operating parameters of the main engine 100. For example, if the ambient temperature is warm, the main engine 100 will operate at a higher speed than if the ambient temperature is cold.

Figure 2:
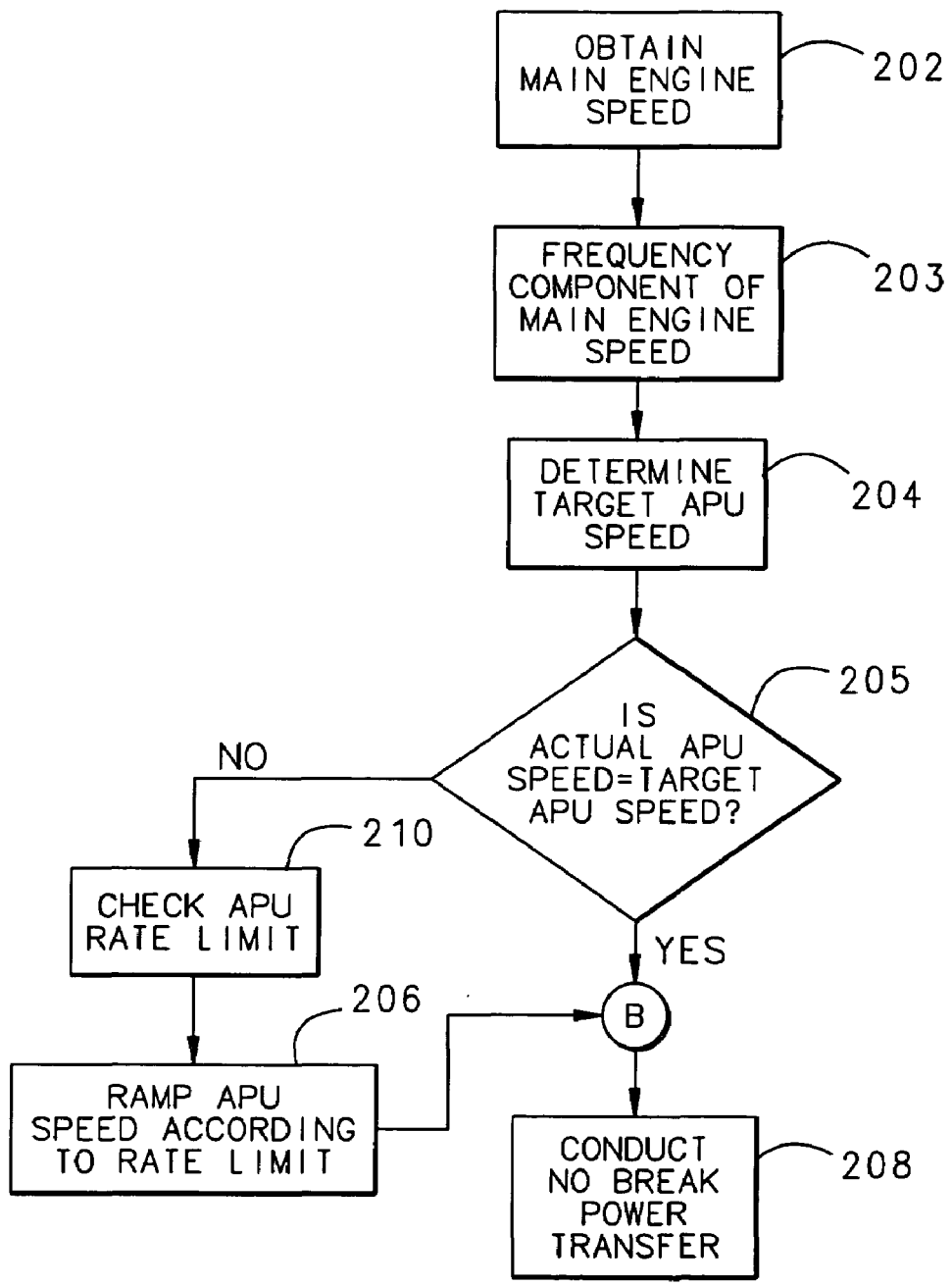
FIG. 2 is a flow diagram illustrating a method according to one embodiment of the invention.

FIG. 2 illustrates one method 200 in which the invention carries out no-break power transfer in greater detail. The APU controller 110 first obtains the main engine speed (e.g., a main engine generator frequency value) from the control unit 104 (block 202). The main engine 100 speed acts as the starting point for the APU controller 110 in determining a target APU speed.

Next, the frequency component of the engine speed is determined (block 203). As noted above, no-break power transfer requires matching of the APU generator frequency with the main engine frequency. Because variations in the engine speed will cause the engine frequency to vary over a frequency range from, for example, 350 Hz to as high as 700 Hz, the APU 102 cannot simply run at a fixed generator frequency to conduct the no-break power transfer. Instead, the APU generator frequency must varied to match the variable generator frequency of the engine 100. More particularly, the APU must run at a target APU speed that can generate the matching generator frequency.

Because it is unlikely that the APU will be running at a speed that generates the matching frequency when no-break power transfer is desired, the APU controller 110 first determines the appropriate target APU speed for the desired APU frequency (block 204). This can be obtained by, for example, a look-up table that links APU frequencies with APU speeds and that is generated via any known engine simulation program. The APU speed itself can be expressed in any desired manner, such as a percentage of engine speed, revolutions per minute, etc., without departing from the scope of the invention. Note that although the engine speed is a main factor in determining the target APU speed, other parameters such as the ambient temperature, engine exhaust temperature, maximum power that can be generated, optimum fuel flow rate, etc. can all affect the target APU speed at any given time. All of these parameters can be taken into account in the simulation to determine their effect on the APU speed.

Once the APU controller 110 determines the target APU speed corresponding with the desired APU generator frequency, the APU controller 110 checks the actual APU speed (block 205). If the actual APU speed is different from the target APU speed, the APU controller 110 ramps the actual APU speed up or down until it reaches the target APU speed (block 206). At this point, the APU generator frequency and the engine generator frequency match, making it safe to conduct the no-break power transfer (block 208).

The rate at which the APU speed adjustment takes place may be varied based on, for example, customer requests or due to limitations in system components. For example, the customer may request that the APU speed be changed over a selected time frame (e.g., 8 seconds), or fuel flow to the APU may be increased at a rate below a fuel rate limit to ensure stable fuel combustion and stable APU performance by preventing, for example, power surges caused by excessive back pressure. In one embodiment, the APU controller 110 ramps the APU speed up or down based on an APU rate limit (block 210). The APU rate limit can be determined and/or calculated by the APU controller 110 based on, for example, the current fuel rate and other factors that affect APU performance.

The APU controller 110 may refer to fuel schedules, which can be obtained via any known method, as part of determining the APU rate limit. In such a case, the APU controller 110 may accelerate or decelerate the APU speed as quickly as possible while still staying within minimum and maximum fuel schedules, ensuring that neither too much nor too little fuel is added to the APU as the APU speed is being ramped.

Note that load limitations of the APU may override an APU speed calculation that is otherwise optimum based on other parameters (e.g., temperature, fuel consumption, etc.). Thus, the invention may also include steps to adjust the APU speed if needed based on the load.

Figure 3:
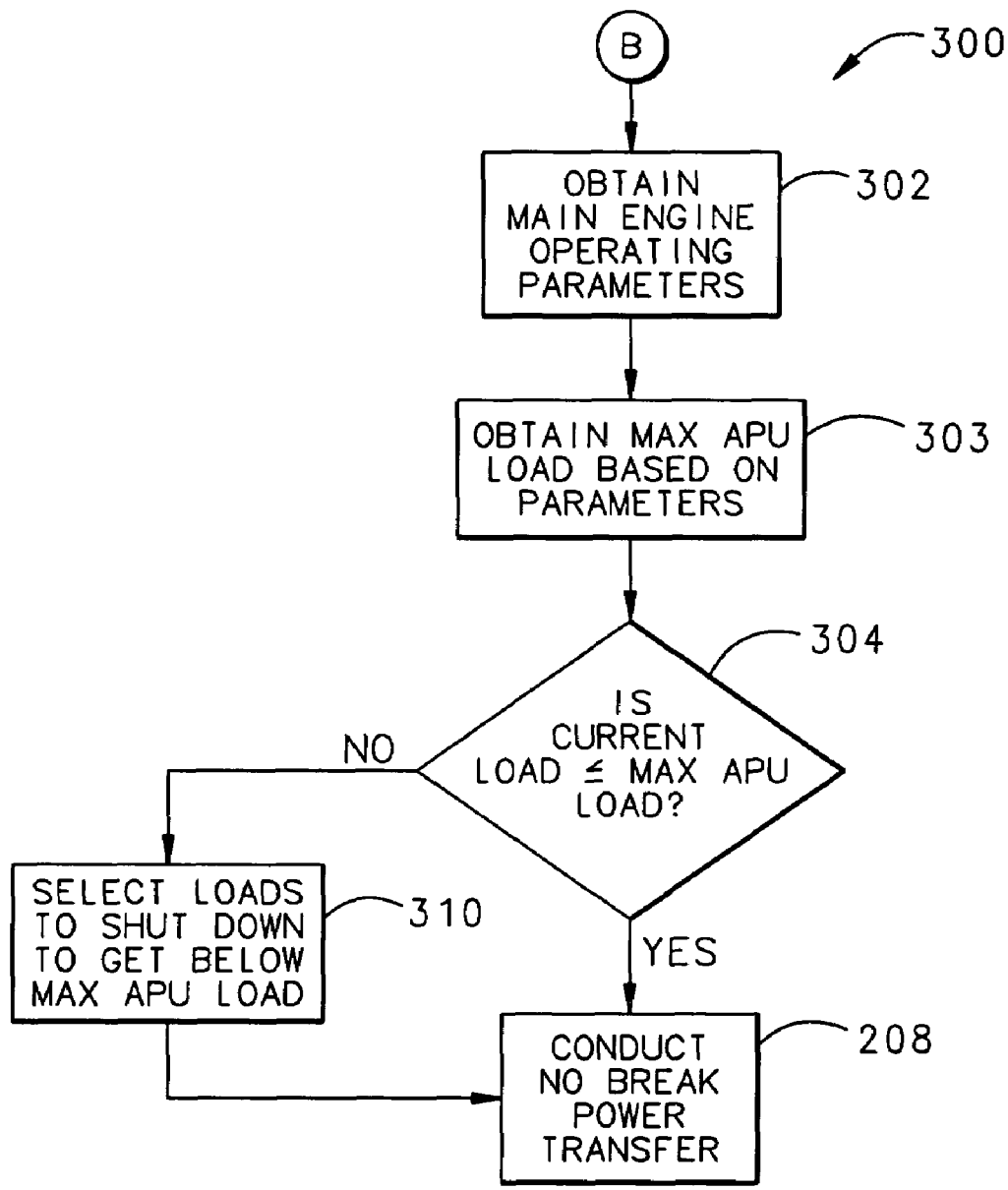
FIG. 3 is a flow diagram illustrating additional steps that can be incorporated into one embodiment of the inventive method.

FIG. 3 is a block diagram illustrating additional steps 300 that may be incorporated into the invention for determining the target APU speed. The APU control takes the parameter (e.g., engine speed, ambient temperature, exhaust temperature, etc.) and uses these parameters as inputs for determining the maximum amount of power that the APU 102 can provide under the conditions defined by the parameters. The specific amount of power that the APU 102 can generate for a given set of parameter inputs can be simulated using any known APU engine simulation program and used as data in a look-up table linking the parameters with a maximum APU load.

Before no-break power transfer takes place, the APU controller 110 obtains the current aircraft electrical load requirements from an aircraft computer via the communication bus 112 (block 302). These parameters are then checked in the look-up table to obtain the maximum APU load that the APU 102 can handle under the current conditions (block 303).

The APU controller 110 then sends the maximum APU load information to the control unit 104, which compares the maximum APU load value with the current aircraft electrical load requirement load on the main engine 100 (block 304). If the current aircraft electrical load requirement is below the maximum APU load, no-break power transfer can be conducted at the target APU speed (block 208). If the current aircraft electrical load is above the maximum APU load, however, the control unit 104 selects which loads 106 can be shut down temporarily during the no-break power transfer to reduce the load on the APU 102 during the transfer (block 310). For example, in an aircraft, the aircraft computer may shut down selected non-essential, low-priority loads 106 (e.g., galleys, passenger cabin lights, etc.) to reduce the total load. The selected low-priority loads 106 are shut down only for the duration of the no-break power transfer (e.g., less than a minute), making the effect of the load shutdown on aircraft operation negligible.

Once the control unit 104 has shut down enough load devices 106 to reduce the main engine load below the calculated maximum APU load, no-break power transfer can be conducted at the APU target speed (block 208) as explained above by ramping the APU speed up or down so that the APU generator frequency matches the main engine generator frequency. Once the transfer is completed, the load 106 can be turned back on as the APU 102 increases speed and therefore generates increased power that allows it to handle greater loads.

As a result, the invention provides a no-break power transfer technique that can be used in variable frequency systems. By providing a communication channel between the control unit associated with the main engine and the APU controller, the APU controller can adjust the APU speed so that the APU generator frequency and the main engine generator frequency match each other for the transfer even though the main engine generator frequency may vary. Further, the invention provides for adjustment of the load on the main engine to a level that the APU can handle. Thus, the invention allows smooth no-break power transfer in variable generator frequency systems without any undue stress on the APU.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A method of facilitating power transfer between a main engine and an auxiliary power unit (APU), comprising:
   obtaining a main engine generator frequency;
   determining a target APU speed that will generate an APU generator frequency that is the same as the main engine generator frequency;
   adjusting an actual APU speed to the target APU speed;
   conducting the power transfer between the main engine and the APU;
   determining an APU rate limit, wherein the step of adjusting the actual APU speed includes keeping an adjustment rate below the APU rate limit; and
   the adjustment of said actual APU speed is taken to occur rapidly, but without extending said APU rate limit.

2. The method of claim 1, wherein the step of determining the target APU speed comprises checking a look-up table linking a plurality of APU frequencies with a plurality of corresponding target APU speeds.

3. The method of claim 1, wherein the APU rate limit is determined based on at least one fuel schedule.

4. The method of claim 1, wherein the step of conducting power transfer comprises connecting the main engine and the APU to a communication bus.

5. An engine control system that facilitates power transfer between a main engine and an auxiliary power unit, comprising:
   a control unit in communication with an aircraft load management system;
   an APU controller in communication with the APU;
   a communication bus that forms a communication link between the control unit and the APU controller,
   wherein the APU controller obtains a main engine generator frequency from the control unit, determines a target APU speed that will generate an APU generator frequency that is the same as the main engine generator frequency, and adjusts an actual APU speed to the target APU speed to allow power transfer between the main engine and the APU, and the APU controller determines an APU rate limit and adjusts the actual APU speed at an adjustment rate below the APU rate limit; and
   the adjustment of said actual APU speed is taken to occur rapidly, but without exceeding said APU rate limit.

6. The engine control system of claim 5, wherein the APU controller obtains the target APU speed by checking a look-up table linking a plurality of APU generator frequencies with a plurality of corresponding target APU speeds.

7. The engine control system of claim 5, wherein the APU controller determines the maximum APU load by checking a look-up table linking the target APU speed with at least one main engine operating parameter.

* * * * *